(12) United States Patent
Marston

(10) Patent No.: US 11,904,297 B1
(45) Date of Patent: Feb. 20, 2024

(54) PROCESS FOR MANUFACTURING LITHIUM SELECTIVE ADSORPTION/SEPARATION MEDIA

(71) Applicant: ENERGYSOURCE MINERALS, LLC, San Diego, CA (US)

(72) Inventor: Charles R. Marston, Midland, MI (US)

(73) Assignee: ILIAD IP COMPANY, LLC, Carlsbad, CA (US)

( * ) Notice: Subject to any disclaimer, the term of this patent is extended or adjusted under 35 U.S.C. 154(b) by 0 days.

(21) Appl. No.: 18/153,329

(22) Filed: Jan. 11, 2023

(51) Int. Cl.
B01J 20/32 (2006.01)
B01J 20/08 (2006.01)

(52) U.S. Cl.
CPC ........... B01J 20/3234 (2013.01); B01J 20/08 (2013.01); B01J 20/3204 (2013.01); B01J 20/3221 (2013.01); B01J 2220/4806 (2013.01)

(58) Field of Classification Search
CPC .... B01J 20/3234; B01J 20/08; B01J 20/3204; B01J 20/3221
See application file for complete search history.

(56) References Cited

U.S. PATENT DOCUMENTS

| | | |
|---|---|---|
| 2,964,381 A | 12/1960 | Goodenough |
| 3,306,700 A | 2/1967 | Neipert et al. |
| 3,493,498 A | 2/1970 | Abrams et al. |
| 4,003,853 A | 1/1977 | Cherubim et al. |
| 4,116,856 A | 9/1978 | Lee et al. |
| 4,116,858 A | 9/1978 | Lee et al. |
| 4,159,311 A | 6/1979 | Bauman et al. |
| 4,221,767 A | 9/1980 | Lee et al. |
| 4,291,001 A | 9/1981 | Repsher et al. |
| 4,347,327 A | 8/1982 | Lee et al. |
| 4,348,295 A | 9/1982 | Burba |
| 4,348,296 A | 9/1982 | Bauman et al. |
| 4,376,100 A | 3/1983 | Lee et al. |
| 4,378,297 A | 3/1983 | Shim |
| 4,381,349 A | 4/1983 | Lee et al. |
| 4,394,353 A | 7/1983 | Miyake et al. |
| 4,430,311 A | 2/1984 | Lee et al. |
| 4,461,714 A | 7/1984 | Burba |

(Continued)

FOREIGN PATENT DOCUMENTS

| | | |
|---|---|---|
| CA | 2452422 C | 6/2006 |
| CA | 2604637 C | 1/2012 |

(Continued)

OTHER PUBLICATIONS

"Dow Engineering Information for Dowex MWA-1, dated Jun. 21, 2016".

(Continued)

Primary Examiner — James A Fiorito
(74) Attorney, Agent, or Firm — Crowe & Dunlevy, P.C.

(57) ABSTRACT

This invention generally relates to a process for manufacturing a lithium selective adsorption/separation media, and more particularly, to a process for manufacturing a lithium selective adsorbent/separation media using a recycled and augmented intercalation reaction liquor. The recycled and augmented intercalation reaction liquor is formed during intercalation and neutralization of the adsorbent manufacturing process.

35 Claims, 4 Drawing Sheets

(56) References Cited

U.S. PATENT DOCUMENTS

| | | |
|---|---|---|
| 4,472,362 A | 9/1984 | Burba |
| 4,477,367 A | 10/1984 | Burba |
| 4,540,509 A | 9/1985 | Burba |
| 5,154,932 A | 10/1992 | Burba et al. |
| 5,389,349 A | 2/1995 | Bauman et al. |
| 5,599,516 A | 2/1997 | Bauman et al. |
| 6,280,693 B1 | 8/2001 | Bauman et al. |
| 6,780,806 B1 | 8/2004 | Yang et al. |
| 7,504,036 B2 | 3/2009 | Gottlieb et al. |
| 7,678,470 B2 | 3/2010 | Yoon et al. |
| 7,828,969 B2 | 11/2010 | Eaton et al. |
| 7,989,388 B2 | 8/2011 | Incorvia et al. |
| 8,147,588 B2 | 4/2012 | Dolan et al. |
| 8,343,401 B2 | 1/2013 | England |
| 8,388,735 B2 | 3/2013 | Bedard et al. |
| 8,540,810 B2 | 9/2013 | Perera et al. |
| 8,637,428 B1 | 1/2014 | Harrison et al. |
| 8,741,150 B2 | 6/2014 | Chung et al. |
| 8,753,594 B1 | 6/2014 | Burba et al. |
| 8,759,250 B2 | 6/2014 | Robinson et al. |
| 8,853,124 B2 | 10/2014 | Incorvia et al. |
| 8,901,032 B1 * | 12/2014 | Harrison ............ B01J 20/08 502/344 |
| 9,012,357 B2 | 4/2015 | Harrison et al. |
| 9,012,712 B1 | 4/2015 | Mooney et al. |
| 9,764,318 B2 | 9/2017 | Harrison et al. |
| 9,771,632 B2 | 9/2017 | Kim et al. |
| 9,789,436 B2 | 10/2017 | Meirav et al. |
| 10,150,056 B2 | 12/2018 | Snydacker |
| 10,266,915 B2 | 4/2019 | Paranthaman et al. |
| 10,266,918 B2 | 4/2019 | Sakai et al. |
| 10,328,424 B2 | 6/2019 | Harrison et al. |
| 10,439,200 B2 | 10/2019 | Snydacker et al. |
| 10,464,042 B2 | 11/2019 | Stabler et al. |
| 10,505,178 B2 | 12/2019 | Snydacker et al. |
| 10,610,858 B2 | 4/2020 | Hornbostel et al. |
| 10,648,090 B2 | 5/2020 | Snydacker et al. |
| 10,695,694 B2 | 6/2020 | Snydacker |
| 10,730,039 B2 | 8/2020 | Bortun et al. |
| 10,773,239 B2 | 9/2020 | Flaugher et al. |
| 10,786,802 B2 | 9/2020 | Boualleg et al. |
| 10,850,254 B2 | 12/2020 | Boualleg et al. |
| 11,124,859 B2 | 9/2021 | Chung et al. |
| 11,179,715 B2 | 11/2021 | Kudryavtsev et al. |
| 11,224,854 B2 | 1/2022 | Omori |
| 11,247,189 B2 | 2/2022 | Riabtsev et al. |
| 11,253,820 B2 | 2/2022 | Bhave et al. |
| 11,253,848 B2 | 2/2022 | Snydacker |
| 11,371,118 B2 | 6/2022 | Zhang et al. |
| 11,466,191 B2 | 10/2022 | Harrison et al. |
| 2014/0239221 A1 | 8/2014 | Harrison et al. |
| 2018/0250653 A1 | 9/2018 | Bai et al. |
| 2019/0314784 A1 | 10/2019 | Lecocq et al. |
| 2020/0009528 A1 | 1/2020 | Chiba et al. |
| 2020/0010926 A1 | 1/2020 | Zhang et al. |
| 2020/0165699 A1 | 5/2020 | Snydacker et al. |
| 2020/0232105 A1 | 7/2020 | Snydacker et al. |
| 2020/0289958 A1 | 9/2020 | Snydacker |
| 2020/0338526 A1 | 10/2020 | Michielsen et al. |
| 2021/0077990 A1 | 3/2021 | Snydacker et al. |
| 2021/0214820 A1 | 7/2021 | Snydacker |
| 2021/0300851 A1 | 9/2021 | Romero et al. |
| 2021/0380429 A1 | 12/2021 | Snydacker et al. |
| 2022/0008892 A1 | 1/2022 | Postma |

FOREIGN PATENT DOCUMENTS

| | | |
|---|---|---|
| CA | 2619356 C | 6/2014 |
| CA | 2933058 A1 | 6/2015 |
| CA | 3048081 A1 | 6/2018 |
| CA | 2767416 C | 8/2018 |
| CA | 3059899 A1 | 10/2018 |
| CA | 3044223 A1 | 11/2019 |
| CA | 3061903 C | 10/2021 |
| EP | 1536128 B1 | 2/2012 |
| EP | 1592750 B1 | 11/2013 |
| EP | 1590079 B1 | 3/2014 |
| EP | 2352399 B1 | 1/2015 |
| EP | 2841179 A1 | 3/2015 |
| EP | 2866915 A1 | 5/2015 |
| EP | 2485834 B1 | 8/2016 |
| EP | 2877137 B1 | 5/2017 |
| EP | 1843076 B1 | 10/2017 |
| EP | 3302787 A1 | 4/2018 |
| EP | 2854989 B1 | 6/2018 |
| EP | 2803401 B1 | 7/2018 |
| EP | 3375517 A1 | 9/2018 |
| EP | 3086874 B1 | 11/2018 |
| EP | 2362848 B1 | 1/2019 |
| EP | 2890483 B1 | 2/2019 |
| EP | 2984124 B1 | 2/2019 |
| EP | 3088446 B1 | 4/2019 |
| EP | 3468709 A1 | 4/2019 |
| EP | 3487597 A1 | 5/2019 |
| EP | B174631 B1 | 8/2019 |
| EP | 2117699 B1 | 10/2019 |
| EP | 3554685 A1 | 10/2019 |
| EP | 3573752 A1 | 12/2019 |
| EP | 3585501 A1 | 1/2020 |
| EP | 3601627 A1 | 2/2020 |
| EP | 1749571 B1 | 4/2020 |
| EP | 3523516 B1 | 5/2020 |
| EP | 3661619 A1 | 6/2020 |
| EP | 3712113 A1 | 9/2020 |
| EP | 3116832 B1 | 11/2020 |
| EP | 3731961 A1 | 11/2020 |
| EP | 3778005 A1 | 2/2021 |
| EP | 3464181 B1 | 3/2021 |
| EP | 3317010 B1 | 8/2021 |
| EP | 3800163 B1 | 11/2021 |
| EP | 3959009 A1 | 3/2022 |
| EP | 3380235 B1 | 7/2022 |
| EP | 3478406 B1 | 9/2022 |
| EP | 3265224 B1 | 12/2022 |
| MX | 2007009603 A | 9/2007 |
| MX | 2007015524 A | 10/2008 |
| MX | 2010011017 A | 1/2011 |
| MX | 2014004107 A | 7/2014 |
| MX | 2018001457 A | 5/2018 |
| MX | 2019009336 A | 1/2020 |
| WO | 03041857 A1 | 5/2003 |
| WO | WO-2016069297 A2 * | 5/2016 ............ B01J 20/041 |
| WO | WO-2016073007 A1 * | 5/2016 ............ B01J 20/041 |
| WO | 2020130682 A1 | 6/2020 |
| WO | 2021011810 A1 | 1/2021 |
| WO | 2021172619 A1 | 9/2021 |
| WO | 2021204375 A1 | 10/2021 |
| WO | 2022004630 A1 | 1/2022 |
| WO | 2022011217 A1 | 1/2022 |

OTHER PUBLICATIONS

"Dow Product Data Sheet for Amberlyst A21, dated Mar. 2016".
"Dow Safety Data Sheet for Research Sample XE832, dated Aug. 29, 2016".
"Purolite Product Data Sheet for Purolite CTA190Plus".
"Rohm & Haas Product Data Sheet for Amberlyst A21, dated Dec. 2003".
"Ryabtsev, A.D., Processing of multicomponent lithium-bearing hydromineral raw material based on its enrichment in lithium. Abstract of dissertation for the degree of doctor of tech. sciences. Tomsk, 2011".
"Undated Dow Product Data Sheet for Dowex Marathon MSA".
"Zvezdov, A., et al., "New Type Filtration, Ion-Exchange, Sorption Small Purpose Multi Process Water Conditioning Device Used as a Multi Cell Water Deionizer" Expanding Issues in Desalination (Sep. 2011) 395-412 (DOI 10.5772/23158)".
Isupov, V. P., "Intercalation Compounds of Aluminum Hydroxide", Journal of Structural Chemistry, vol. 40, No. 5, 1999.
Isupov, Vitaly P., et al., "Synthesis, Structure, Properties, and Application of Aluminium Hydroxide Intercalation Compounds", Chemistry for Sustainable Development 8 (2000) 121-127.

(56) References Cited

OTHER PUBLICATIONS

Tarasov, Konstantin A., et al., "A time resolved, in-situ X-ray diffraction study of the de-intercalation of anions and lithium cations from [LiA]i(OH)6]nX•qH20 (X = Cr, Br-, N03-, SO/-)", J. Mater. Chem., 14, 1443-1447 (2004).

\* cited by examiner

PROCESS FOR MANUFACTURING LITHIUM SELECTIVE ADSORPTION/SEPARATION MEDIA

BACKGROUND OF THE INVENTION

1. Field of the Invention

The subject matter disclosed herein relates to a process for manufacturing a lithium selective adsorption/separation media, and more particularly, to a process for manufacturing a lithium selective adsorbent using a recycled and augmented intercalation reaction liquor.

2. Description of the Related Art

The growing demand for lithium in various applications, particularly lithium-ion batteries, means that lithium-bearing brines are becoming increasingly attractive as new energy resources. Brines from mineral clays, petro-brines, Smackover brines, continental brines, and geothermal brines are expected to provide increasingly higher amounts of lithium to the battery metals market, particularly through new developments in direct lithium extraction (DLE) processes. Until recently, most of the lithium mined was recovered from hard rock resources and continental brines in South America, China, and Australia using solar evaporative processes. In some instances, the primary product of such brine processing is potassium, with lithium being produced as a side product.

Geothermal brines are of particular interest as a lithium resource for several reasons. First, some hot geothermal brine resources are often lithium bearing and at high-pressure underground, which, when released to atmospheric pressure, can provide a flash-steam for electrical power generation. In some geothermal waters and brines, associated binary processes can heat a secondary fluid that is used to generate steam for electricity without the flashing of the geothermal brine. Additionally, geothermal brines contain numerous useful chemical components and compounds that can be recovered and utilized for secondary processes.

As lithium has gained importance for use in various applications, there are continuing efforts to develop simple and inexpensive DLE processes for recovering lithium from brine resources. There have been significant efforts in using layered lithium aluminates, typically of the formula LiX/Al(OH)$_3$, such as described in, for example, U.S. Pat. Nos. 9,012,357, 8,901,032, 8,753,594, 8,637,428, 6,280,693, 4,348,295, and 4,461,714 and U.S. Patent Application Publication Nos. 2014/0239224 and 2018/0056283 (each of which is expressly incorporated by reference herein). Unfortunately, such processes generally employ packed columns for lithium recovery that suffer from several drawbacks, such as shortened lifetimes due to the gradual deterioration and disintegration of the particles and collapse of the crystal structures.

SUMMARY OF THE INVENTION

The invention relates to a process for manufacturing lithium selective adsorbent containing LADH. With the increasing value of lithium in the marketplace and the drive toward zero discharge at production facilities, the inventive process improves the economic and environmental impact of manufacturing lithium selective adsorbent/separation media by recycling the lithium-containing reaction intercalation liquor. At the commercial scale, without recycling and reusing the lithium chloride in subsequent intercalation, the lost lithium chloride could be non-economical, and waste management could be costly.

Accordingly, it is an object of this invention to provide a process that quickly and efficiently manufactures an LADH lithium selective adsorbent using a recycled and augmented intercalation reaction liquor that converts crystalline aluminum trihydroxides (Al(OH)$_3$) (e.g., Gibbsite, and its common polymorphs, Bayerite and Nordstrandite) to LADH. The recycled and augmented intercalation reaction liquor is produced during intercalation of the Gibbsite-bearing adsorbent precursor using excess lithium salt in a dilute brine with alkaline conditions at a predetermined intercalation temperature, followed by neutralization using an appropriate acid at a predetermined neutralization temperature.

In general, in a first aspect, the invention relates to a process for manufacturing a lithium selective adsorbent. The process intercalates a Gibbsite-bearing adsorbent precursor at a predetermined intercalation temperature using a reaction volume of a fresh intercalation reaction liquor, a recycled and augmented intercalation reaction liquor, or a mixture of both to form an intercalated layered aluminate adsorbent. The intercalated layered aluminate adsorbent is then neutralized under acidic conditions at a predetermined neutralization temperature.

In an embodiment, the process can include providing the Gibbsite-bearing adsorbent precursor. In an embodiment, the process can include producing the Gibbsite-bearing adsorbent precursor by forming aluminum hydroxide (Al(OH)$_3$) crystals in situ within pores of an ion exchange resin. The pores of the ion exchange resin can be impregnated with an aluminum chloride (AlCl$_3$) solution, and then the AlCl$_3$ impregnated resin is infiltrated with alkali to form Al(OH)$_3$ microcrystal seeds within the pores of the ion exchange resin. The Al(OH)$_3$ seeded resin is infiltrated with an alkaline aluminate solution, and an acid is used to remove excess NaOH produced in the Al(OH)$_3$ microcrystal seeds formation.

In an embodiment, the ion exchange resin can be a polystyrene-based ion exchange resin, and more particularly, an organic, porous polystyrene-based ion exchange resin bead. In an embodiment, the ion exchange resin is functionalized as a strong base anion (SBA) or a weakly basic anion (WBA) exchange resin, and the WBA exchange resin can be in an HCl form before the step of impregnating the pores of the ion exchange resin with the AlCl$_3$ solution.

In an embodiment, the intercalation reaction liquor can be augmented by reconstituting the reaction volume by adding lithium salt and an alkali to the intercalation reaction liquor. The reconstituted intercalation reaction liquor can be filtered, if necessary. In an embodiment, the lithium salt can be LiCl, LiNO$_3$, LiBr, LiOH, or a mixture thereof, or more particularly, the lithium salt is LiCl. Additionally, the alkali can be an alkali hydroxide, an alkaline earth metal hydroxide, a strong base, a monoacid base, ammonia, or a mixture thereof, namely KOH, NaOH, LiOH, or a mixture thereof, and more particularly, the alkali is NaOH.

In an embodiment, the Gibbsite-bearing adsorbent precursor can be intercalated with heat at the predetermined intercalation temperature in the presence of an excess lithium salt in a dilute brine under alkaline conditions.

In an embodiment, the intercalation temperature can be between about 25° C. and about 125° C. (and any range or value therebetween), and more particularly, between about 85° C. and about 105° C.

In an embodiment, the lithium salt can be LiCl, LiNO$_3$, LiBr, LiOH, or a mixture thereof, and more particularly, the lithium salt can be LiCl.

In an embodiment, the dilute brine contains a majority of chloride salts, and can be NaCl, NaBr, NaNO$_3$, KCl, KBr, or a mixture thereof. More particularly, the dilute brine can be NaCl.

In an embodiment, the alkaline conditions can have a pH from about 7 to about 13 (and any range or value therebetween), and more particularly, between about 9 and about 12. In an embodiment, the alkali can be an alkali hydroxide, an alkaline earth metal hydroxide, a strong base, a monoacid base, ammonia, or a mixture thereof. The alkali can be KOH, NaOH, LiOH, or a mixture thereof, and more particularly, the alkali can be NaOH. The alkali can have a concentration between about 1 to about 3 mol of the alkali per mol of Al(OH)$_3$ in the adsorbent (and any range or value therebetween), and more particularly about 1 to 1.5 mol of the alkali per mol of Al(OH)$_3$ in the adsorbent.

In an embodiment, the acidic conditions can have a pH from about 4.5 to about 7 (and any range or value therebetween), and more particularly, between about 5 and about 5.8. In an embodiment, the acid is a strong acid, a mineral acid, a sulfonic acid, a carboxylic acid, or a mixture thereof. The acid can be hydrochloric acid, sulfuric acid, nitric acid, phosphoric acid, hydrobromic acid, perchloric acid, formic acid, acetic acid, or a mixture thereof, and more particularly, the acid can be acetic acid. The acid can have a concentration of between about 5% and about 100% (and any range or value therebetween).

In an embodiment, the neutralization temperature can be between about 25° C. and about 115° C. (and any range or value therebetween), and more particularly, between about 65° C. and about 80° C.

In an embodiment, the lithium salt is LiCl, the dilute brine is NaCl, the alkali is NaOH, and the acid is acetic acid.

In an embodiment, the step of intercalating the Gibbsite-bearing adsorbent precursor can also include intercalating the Gibbsite-bearing adsorbent precursor by heating to the predetermined intercalation temperature in the presence of the excess lithium salt in the dilute brine under the alkaline conditions for a predetermined amount of intercalation time.

In an embodiment, the predetermined amount of intercalation time can be between about 0.375 hours and about 390 hours (and any range or value therebetween), and more particularly, between about 1.5 hours and about 6 hours.

In an embodiment, the step of neutralizing the intercalated layered aluminate adsorbent can also include neutralizing the intercalated layered aluminate adsorbent under the acidic conditions at the predetermined neutralization temperature for a predetermined amount of neutralization time.

In an embodiment, the predetermined amount of neutralization time can be between about 0.03125 hours and about 16 hours (and any range or value therebetween), and more particularly, between about 0.25 hours and about 1 hours.

In general, in a second aspect, the invention relates to a process for manufacturing a lithium aluminum double hydroxide (LADH) lithium selective adsorbent. The process includes intercalating the adsorbent under alkaline conditions at a predetermined intercalation temperature using a reaction volume of a fresh intercalation reaction liquor, a recycled and augmented intercalation reaction liquor, or a mixture of both to form an intercalated layered aluminate adsorbent. The fresh intercalation reaction liquor, the recycled and augmented intercalation reaction liquor, or both include an excess lithium salt in a dilute brine, wherein the intercalation temperature is between about 25° C. and about 125° C. (and any range or value therebetween), wherein the lithium salt comprises LiCl, and wherein the alkaline conditions comprises an alkaline pH from about 7 to about 13 (and any range or value therebetween), and wherein the alkali is NaOH. The process also includes neutralizing the intercalated adsorbent under acidic conditions at a predetermined neutralization temperature, wherein the neutralization temperature is between about 25° C. and about 115° C. (and any range or value therebetween), and wherein the acid is acetic acid. The intercalation reaction liquor is augmented to the reaction volume by adding LiCl and NaOH to the intercalation reaction liquor, and then the augmented intercalation reaction liquor is recycled to the intercalation step as the recycled and augmented intercalation reaction liquor.

In an embodiment, the intercalation temperature can be between about 85° C. and about 105° C. (and any range or value therebetween).

In an embodiment, the dilute brine contains a majority of chloride salts, and can be NaCl, NaBr, NaNO$_3$, KCl, KBr, or a mixture thereof. More particularly, the dilute brine can be NaCl.

In an embodiment, the alkaline conditions can have a pH between about 9 and about 12 (and any range or value therebetween).

In an embodiment, the alkali can be an alkali hydroxide, an alkaline earth metal hydroxide, a strong base, a monoacid base, ammonia, or a mixture thereof. The alkali can be KOH, NaOH, LiOH, or a mixture thereof, and more particularly, the alkali can be NaOH. The alkali can have a concentration between about 1 to about 3 mol of the alkali per mol of Al(OH)$_3$ in the adsorbent (and any range or value therebetween), and more particularly between about 1 to about 1.5 mol of the alkali per mol of Al(OH)$_3$ in the adsorbent.

In an embodiment, the acidic conditions can have a pH from about 4.5 to about 7 (and any range or value therebetween), and more particularly, between about 5 and about 5.8. In an embodiment, the acetic acid can have a concentration of between about 5% and about 100% (and any range or value therebetween).

In an embodiment, the neutralization temperature can be between about 65° C. and about 80° C. (and any range or value therebetween).

In an embodiment, the step of intercalating the adsorbent can also include intercalating the adsorbent by heating to the predetermined intercalation temperature in the presence of the excess lithium salt in the dilute brine under the alkaline conditions for a predetermined amount of intercalation time.

In an embodiment, the predetermined amount of intercalation time can be between about 0.375 hours and about 390 hours (and any range or value therebetween), and more particularly, between about 1.5 hours and about 6 hours.

In an embodiment, the step of neutralizing the intercalated adsorbent can also include neutralizing the intercalated adsorbent under the acidic conditions at the predetermined neutralization temperature for a predetermined amount of neutralization time.

In an embodiment, the predetermined amount of neutralization time can be between about 0.03125 hours and about 16 hours (and any range or value therebetween), and more particularly, between about 0.25 hours and about 1 hours.

In an embodiment, the process can include providing the Gibbsite-bearing adsorbent precursor. In an embodiment, the process can include producing the Gibbsite-bearing adsorbent precursor by forming aluminum hydroxide (Al(OH)$_3$) crystals in situ within pores of an ion exchange resin. The pores of the ion exchange resin can be impregnated with an aluminum chloride (AlCl$_3$) solution, and then the AlCl$_3$ impregnated resin is infiltrated with alkali to form Al(OH)$_3$ microcrystal seeds within the pores of the ion exchange resin. The Al(OH)$_3$ seeded resin is infiltrated with an alkaline aluminate solution, and an acid is used to remove excess NaOH produced in the Al(OH)$_3$ microcrystal seeds formation.

In an embodiment, the ion exchange resin can be a polystyrene-based ion exchange resin, and more particularly, an organic, porous polystyrene-based ion exchange resin bead. In an embodiment, the ion exchange resin is functionalized as a strong base anion (SBA) or a weakly basic anion (WBA) exchange resin, and the WBA exchange resin can be in an HCl form before the step of impregnating the pores of the ion exchange resin with the AlCl$_3$ solution.

BRIEF DESCRIPTION OF THE DRAWINGS

The above and other objects and advantages of this invention may be more clearly seen when viewed in conjunction with the accompanying drawing wherein.

DETAILED DESCRIPTION OF THE INVENTION

Figure 1:
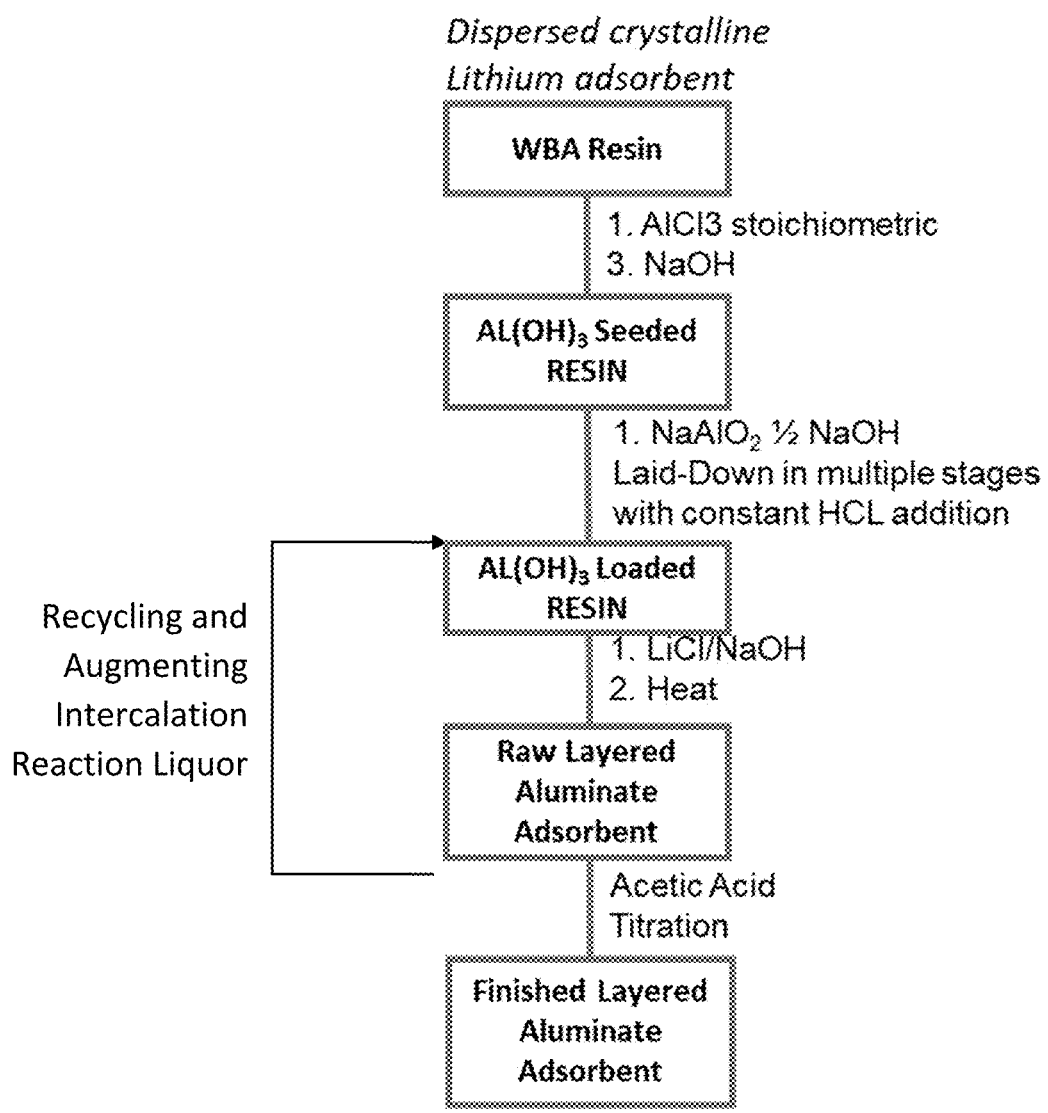
FIG. 1 is a process flow diagram for an exemplary process for manufacturing an LADH lithium selective adsorbent/separation media in accordance with an illustrative embodiment of the invention disclosed herein.

While this invention is susceptible to embodiment in many different forms, there are shown in the drawings and will herein be described hereinafter in detail some specific embodiments of the invention. It should be understood, however, that the present disclosure is to be considered an exemplification of the principles of the invention and is not intended to limit the invention to the specific embodiments so described.

Generally, lithium aluminum double hydroxide (LADH) lithium selective adsorbents are manufactured from microcrystalline, hydrated aluminum trihydroxides (Al(OH)$_3$) (e.g., Gibbsite, and its common polymorphs, Bayerite and Nordstrandite), by heating the hydrated alumina precursor with one or more lithium salts at an elevated pH using alkali chemicals, such as hydroxide salts of sodium, lithium, or potassium. As used herein, Gibbsite includes its two common polymorphs, Bayerite and Nordstrandite.

The lithium selective adsorbent has an inorganic composition. The term "inorganic," as used herein, refers to those compositions not containing carbon or wherein carbon is present but in its elemental state. Typically, the inorganic composition includes at least one metal, wherein the term "metal," as used herein, includes traditionally defined metals as well as metalloids (those elements having both metallic and non-metallic properties and which overlap with the main group elements). The inorganic composition can be or can include a metal oxide composition, such as silica, Gibbsite, Boehmite, Nordstrandite, bayerite, alumina, (e.g., alumina, θ-Al$_2$O$_3$, χ-Al$_2$O$_3$, κ-Al$_2$O$_3$, ε-Al$_2$O$_3$, δ-Al$_2$O$_3$, AlO(OH), pseudoboehmite, or a combination thereof) or an aluminosilicate, such as a zeolite, e.g., MFI-type, MEL-type, MTW-type, MCM-type, BEA-type, faujasite, or ZSM-type zeolites. The metal oxide composition may alternatively be or include, for example, zirconium oxide, yttrium oxide, titanium oxide, cerium oxide, chromium oxide, copper oxide, nickel oxide, or hafnium oxide, or a combination thereof.

The inorganic composition can include a metal carbide composition, such as silicon carbide, iron carbide (e.g., steel), tungsten carbide, titanium carbide, molybdenum carbide, or boron carbide, or combination thereof The inorganic composition can include a metal nitride composition, such as boron nitride, silicon nitride, silicon oxynitride, silicon carbide nitride, aluminum nitride, tantalum nitride, or zirconium nitride, or combination thereof. Alternatively, the inorganic composition can include a metal boride composition, such as aluminum boride, titanium boride, cobalt boride, tantalum boride, or magnesium boride, or combination thereof. The inorganic composition can also include a ceramic composition, which may be an oxide, carbide, nitride, or boride material.

The support for the lithium selective adsorbent can be a polymer, for example, a polyimide, polyether ether ketone (PEEK), polybenzimidazole, ionomer (e.g., sulfonated tetrafluoroethylene, such as Nafion), polysiloxane (e.g., a silicone rubber or foam), polyurethane, polycarbonate, polyethyleneimine (PEI), polyester (e.g., polyethylene terephthalate), polyamide (e.g., a nylon), vinyl addition polymer (e.g., polyvinylchloride, polyethylene, polypropylene, polystyrene or a fluoropolymer, such as PVDF or PTFE), a mixture of polymers or a copolymer that includes one or more of any of the foregoing polymers. The polymer may alternatively be a composite that includes at least one of the foregoing polymers, wherein the composite includes separate regions (e.g., layers) of polymers of different compositions. The polymer may alternatively be an ion exchange resin bead or particle.

As used herein, the lithium selective adsorbent can have any of the lithium aluminum intercalate ("LAI") forms known in the art, such as lithium aluminum layered double hydroxide chloride (LiCl·2Al(OH)$_3$), Bayerite-based and/or Gibbsite-based lithium aluminum layered double hydroxide, lithium aluminum intercalate (LiAl$_2$(OH)$_6$Cl) ("LADH") crystals in microporous, polymeric resin beads or other suitable adsorbent support noted above.

The invention disclosed herein is directed to a process for manufacturing a lithium selective adsorbent containing LADH using a recycled and augmented intercalation reaction liquor. FIG. 1 illustrates an exemplary process flow diagram for the inventive manufacturing process. As exemplified, the inventive process for manufacturing a LADH lithium selective adsorbent grows LAI (LiAl$_2$(OH)$_6$Cl) crystals in situ within open cavities of an organic ion exchange resin (e.g., a polystyrene-based ion exchange resin beads or dimethylamine functionalized chloromethylated copolymer of styrene and divinylbenzene). The porous ion exchange resin is seeded with hydrous crystalline alumina by initially impregnating the pores of the organic ion exchange resin beads with a stoichiometric or near-stoichiometric amount of aluminum chloride (AlCl$_3$) solution. Aluminum chloride forms a Lewis Acid/Lewis Base complex with the ion exchange resins free amine functionality. The AlCl$_3$-impregnated resin beads are then infiltrated with a stoichiometric or near-stoichiometric amount of alkali (e.g., sodium hydroxide or lithium hydroxide) forming aluminum hydroxide (Al(OH)$_3$) microcrystals (seeds) on the surface of the internal pores of the resin beads.

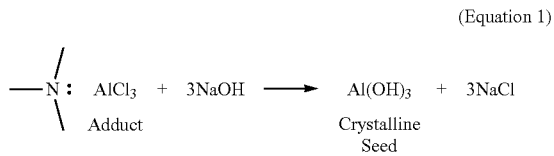

(Equation 1)

Aluminum hydroxide microcrystal seed formation is followed by infiltration with an alkaline solution of sodium aluminate, and an dilute acid is used with multiple additions to control the pH and remove excess NaOH produced in the crystalline reformation of Al(OH)$_3$ in-situ generally as Gibbsite within the pores of the beads. Any excess alkaline aluminate solution or Al(OH)$_3$ solution that may have formed on the surface(s) of the resin bead are removed with gentle agitation in water. The seeds of hydrous crystalline alumna within the pores are used as growth sites for producing additional crystallized Al(OH)$_3$ with alkaline aluminate solution treatments.

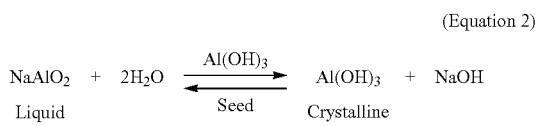

(Equation 2)

The inventive process then intercalates the crystalline hydrous alumina in the pores to LAI by treating the Al(OH)$_3$ loaded resin beads with excess lithium salt in a dilute brine with alkaline conditions at a predetermined elevated temperature. The inventive intercalation process is generally performed with a stoichiometric excess of lithium salt to drive the reaction forming LADH from Gibbsite.

$$L_nX+2_nAl(OH)_3+pH_2O=[LiAl_2(OH)_6]_nX \cdot pH_2O$$
(LADH-X)    (Equation 3)

where X=Cl$^-$, Br$^-$, I$^-$, SO$_4^{2-}$, NO$_3^-$—

Once intercalated with lithium, the LADH adsorbent is neutralized with an appropriate acid.

Figure 2:
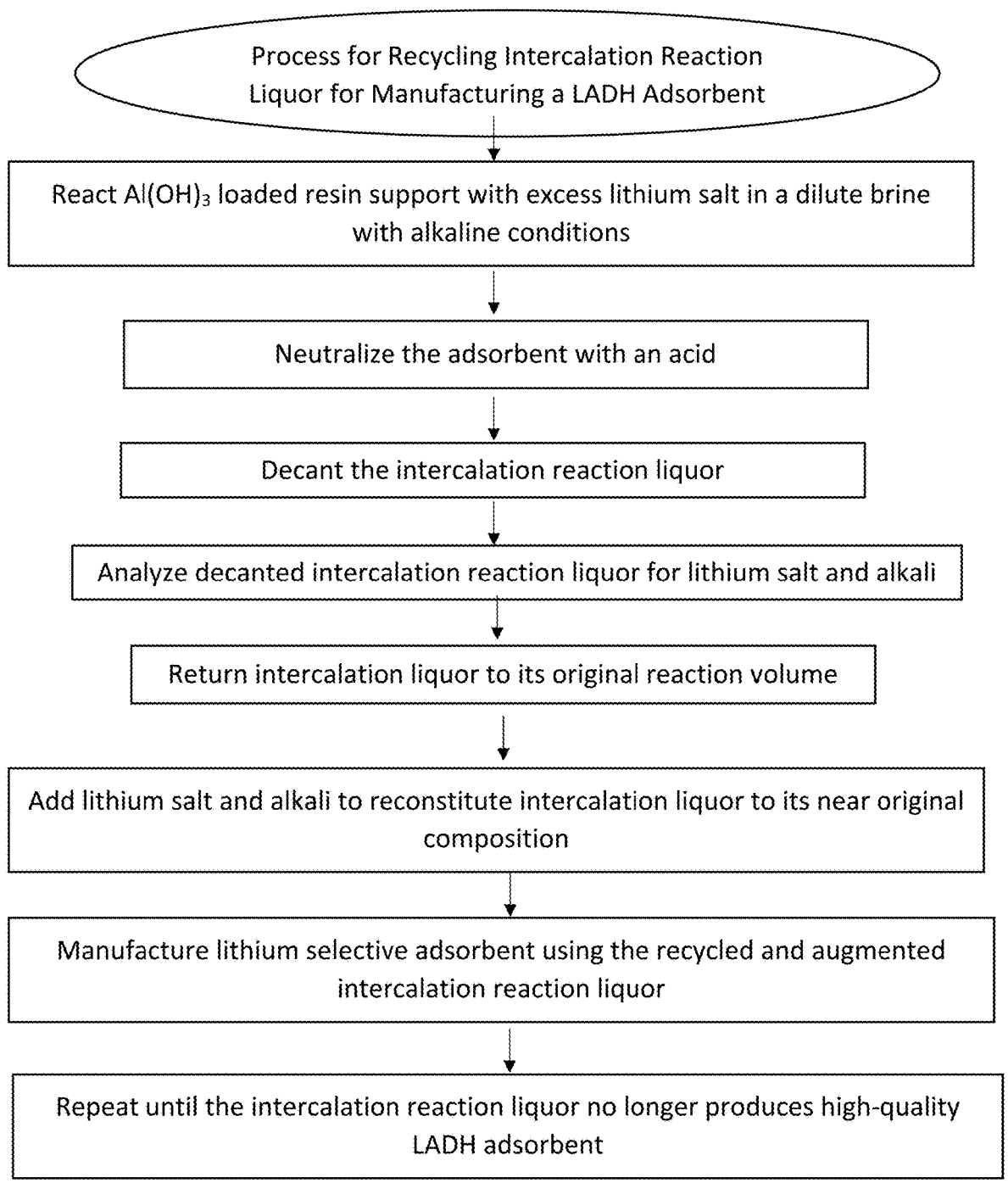
FIG. 2 is a process flow diagram for an exemplary process of recycling and augmenting an intercalation reaction liquor for manufacturing an LADH lithium selective adsorbent/separation media in accordance with an illustrative embodiment of the invention disclosed herein.

FIG. 2 illustrates an exemplary process flow diagram for the inventive recycling process. Upon completion of the aluminum trihydroxide (e.g., Gibbsite) to LADH conversion, the intercalation reaction liquor containing excess lithium salts can be decanted and recycled for use in the manufacturing of LADH adsorbent. Before recycling the intercalation liquor, it is analyzed for lithium and alkali, returned to its original reaction volume, and then lithium salt and alkali are added to reconstitute the reaction liquor to its near original composition. Filtration may be applied to remove any suspended solids that may have formed. The reconstituted intercalation liquor is employed in the manufacturing process, and the same procedure is followed, repeating the reconstitution of the intercalation reaction liquor, the addition of lithium salt and alkali, and filtration, if needed. This process is repeated until the reaction no longer produces high-quality LADH adsorbents to realize significant savings in lithium losses and waste treatment costs.

The dilute brine can be NaCl, NaBr, NaNO$_3$, KCl, KBr, or a mixture thereof, and other dilute brines preferably containing a majority of chloride salts. Also, the lithium salt can be LiCl, LiNO$_3$, LiBr, LiOH, or a mixture thereof. The lithium in the intercalation liquor is in a ratio with aluminum ranging from about 1:1 to about 5:1 Li to Al (and any range or value therebetween). The alkali in the intercalation liquor yields a pH from about 7 to about 13 (and any range or value therebetween), and more particularly, a pH between about 9 and about 12. The alkali can be hydroxides of potassium, sodium, lithium, or of other alkali or alkaline earth metals, other suitable strong or monoacid bases, ammonia (potentially from urea thermal decomposition), or a mixture thereof, and the alkali concentration is about 1 to about 3 mol of the alkali per mol of Al(OH)$_3$ in the adsorbent (and any range or value therebetween), and more particularly about 1 to about 1.5 mol of the alkali per mol of Al(OH)$_3$ in the adsorbent, being processed. The predetermined elevated temperature can be between about 25° C. and about 125° C. (and any range or value therebetween), and more particularly, between about 85° C. and about 105° C. Depending upon the intercalation temperature, the intercalation time can be between about 0.75 hours and about 192 hours (and any range or value therebetween), and more particularly, about 1.5 hours to about 6 hours.

TABLE 1

Intercalation Time and Temperatures.

| | Temperature (° C.) | | | | | | | | | | |
|---|---|---|---|---|---|---|---|---|---|---|---|
| | 125 | 115 | 105 | 95 | 85 | 75 | 65 | 55 | 45 | 35 | 25 |
| Time (Hours) | 0.375 | 0.75 | 1.5 | 3 | 6 | 12 | 24 | 48 | 96 | 192 | 390 |

Once intercalated with aluminum trihydroxide, the LADH adsorbent is neutralized with an acid to a pH of about 4.5 and about 7 (and any range or value therebetween), and more particularly, a pH between about 5 and about 5.8. The acid can be hydrochloric, sulfuric, nitric, phosphoric, hydrobromic, perchloric, formic, acetic, or other suitable strong, mineral, sulfonic, or carboxylic acids, or a mixture thereof. The acid can have a concentration of between about 5% and about 100% (and any range or value therebetween). The temperature of the neutralization can range from about 25° C. to about 115° C. (and any range or value therebetween), and more particularly, from between about 65° C. and about 80° C.

TABLE 2

Neutralization Time and Temperatures.

| | Temperature (° C.) | | | | | | | | | |
|---|---|---|---|---|---|---|---|---|---|---|
| | 115 | 105 | 95 | 85 | 75 | 65 | 55 | 45 | 35 | 25 |
| Time (Hours) | 0.03125 | 0.0625 | 0.125 | 0.25 | 0.5 | 1 | 2 | 4 | 8 | 16 |

EXAMPLES

The process for manufacturing lithium selective adsorption/separation media is further illustrated by the following examples, which are provided for the purpose of demonstration rather than limitation.

Example 1—Augmenting and Recycling Intercalation Reaction Liquor

A sample of LADH lithium selective adsorbent (EnergySource Mineral, LLC, ILiAD™, San Diego, CA) was damaged by the complete de-intercalation, which reverted the LADH of the adsorbent back to Gibbsite. Twenty-five milliliters (25 mL) of the LADH adsorbent was slurried in 50 mL of 15% sodium chloride brine. Ten grams (10 g) of 50% NaOH and 10 g of LiCl were added to the slurry, and the slurry was gently stirred and placed in a 95° C. oven overnight. The reaction liquor containing excess lithium salts was decanted away from the adsorbent, and the pH of the reaction liquor was measured to be 9.1. The decanted reaction liquor is saved for use in a subsequent conversion of Gibbsite-bearing adsorbent to the active LADH form.

The decanted adsorbent was slurried into 50 mL of fresh de-intercalation solution (i.e., water with less than about 100 ppm Li as LiCl), heated to 75° C., and the pH of the slurry was 9.1. At 75° C., the adsorbent slurry was titrated slowly using a few milliliters of acetic acid (glacial or dilute) until the pH held between 5 and 6 for 30 min. The augmented and titrated sample was rinsed with one volume of de-intercalation solution.

Example 2—Manufacturing of LADH Adsorbent Using the Augmented and Recycled Intercalation Reaction Liquor A nearly 20-fold excess of lithium chloride is employed in converting the Gibbsite within the adsorbent precursor to its lithium-selective LADH form (the intercalation step). This example outlines a process for recycling lithium chloride in subsequent intercalation of latent Gibbsite to LADH.

A fresh 25 mL sample of Gibbsite-bearing adsorbent precursor was activated to the LADH form using the recovered reaction liquor of Example 1. The 42.4 mL of saved reaction liquor from recycle 0 (Example 1) was augmented with 8.6 mL fresh 15% NaCl brine, returning it to its original 50 mL volume. The augmented liquor was filtered to remove suspended solids, such as aluminum hydroxide and sodium salts, and then analyzed for lithium and free hydroxide. The lithium concentration was 26.5 g/L which is ~81% of the original lithium concentration. The lithium concentration was returned to about 32.75 g/L by the addition of 1.9 g LiCl. In addition, 2 g of fresh 50% sodium hydroxide was added to reconstitute the alkali.

The 25 mL sample of Gibbsite-bearing precursor was treated in the same fashion as in Example 1 but using the recycled and augmented intercalation liquor. As in Example 1, the slurry was gently mixed and placed in an oven at 95° C. for 6 hr, then the slurry was again gently mixed, and the pH was taken and was measured at 9.8. As a general process, if the pH was less than 9.0, 1 g of 50% NaOH would be added to sufficiently increase the pH. Heating was continued for an additional 6 hr.

After cooling to 75° C., the reaction liquor was decanted and saved for use in a subsequent recycle. The adsorbent sample created (recycle 1) was neutralized hot with titration by acetic acid, as in Example 1. The neutralized sample was placed in the cycle testing apparatus and run for 25 intercalation/elute cycles. The results after 25 cycles for recycle 1 were recorded, and the reversible lithium loading capacity for recycle 0 (Example 1) was taken as 100% for comparison to subsequent recycles using identical samples of Gibbsite-bearing precursor.

Figure 3:
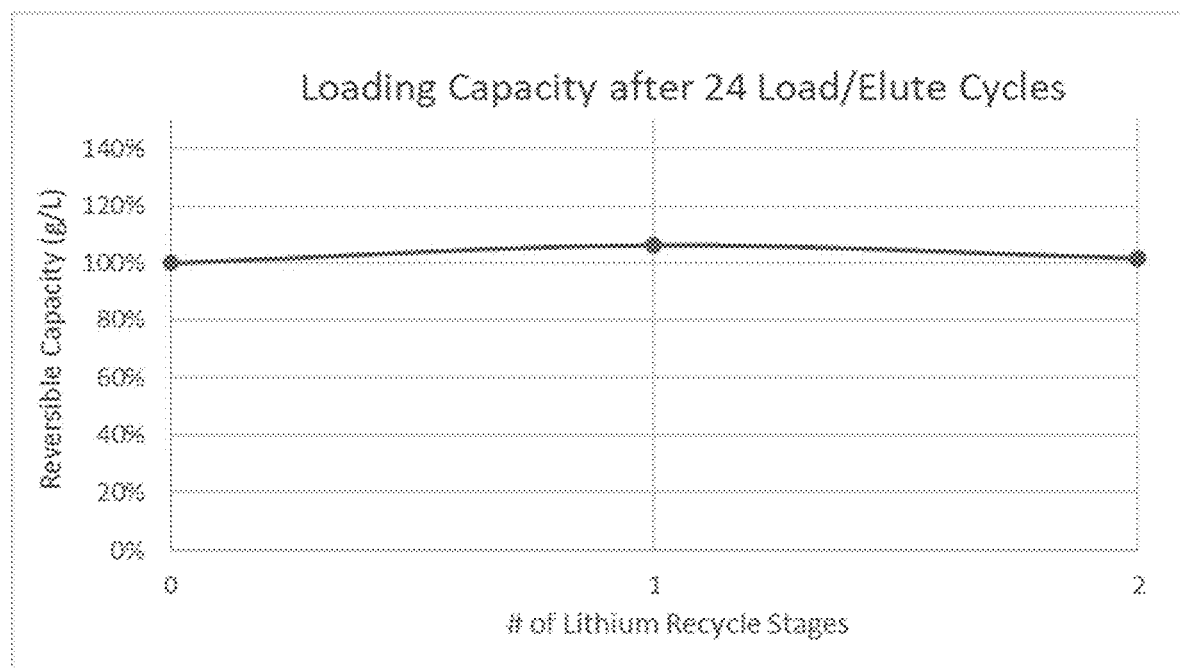
FIG. 3 graphically illustrates LADH adsorbent manufacturing with successive lithium chloride recycles according to an illustrative embodiment of the invention disclosed herein.

The same process was used in recycling the intercalation liquor for 2 recycles of the liquor (recycle 1 and 2). The graph of FIG. 3 shows that these successive recycles successfully produced LADH adsorbents each time.

Figure 4:
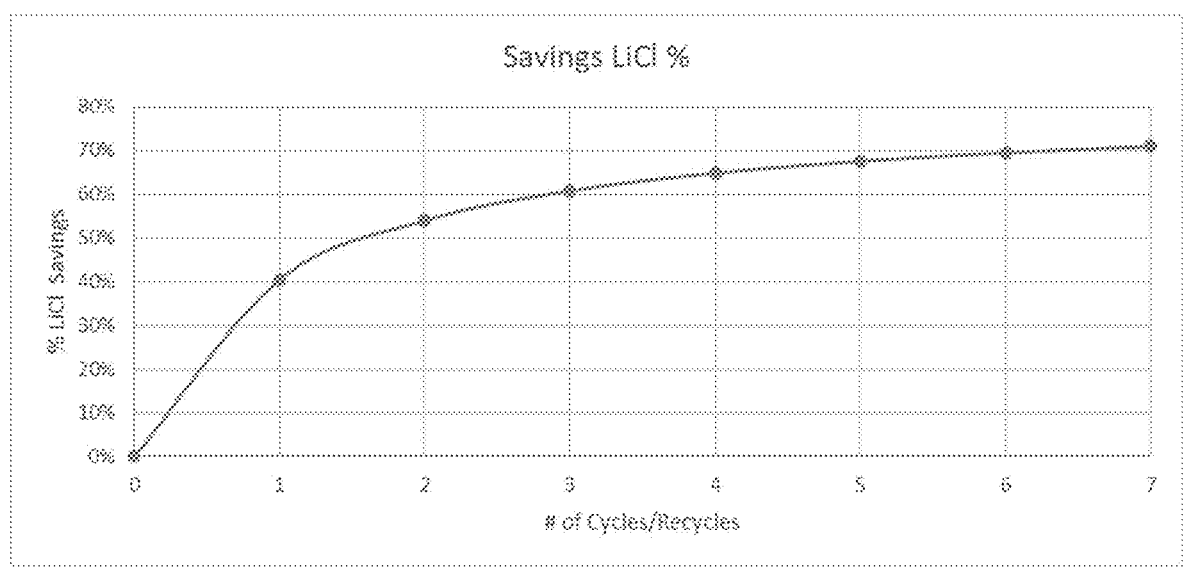
FIG. 4 graphically illustrates the lithium chloride savings provided by an illustrative embodiment of the invention disclosed herein.

This Example 2 demonstrates that with the large excess of LiCl employed in the intercalation step, the high initial LiCl usage can be mitigated by successive recycling of the intercalation liquor. FIG. 4 graphically illustrates the lithium chloride savings with successive recycles.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted as a range whose lower limit is 25 and whose upper limit is 100. Additionally, it should be noted that where a range is given, every possible subrange or interval within that range is also specifically intended unless the context indicates the contrary. For example, if the specification indicates a range of 25 to 100, such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only, and decimal and fractional values (e.g., 46.7-91.3) should also be understood to be intended as possible subrange endpoints unless specifically excluded.

It should be understood that the exemplary embodiments described above should be considered in a descriptive sense only and not for purposes of limitation. Descriptions of features or aspects within these embodiments should typically be considered as available for other similar features or aspects in other embodiments.

While one or more embodiments have been described with reference to the figures, it will be understood by those of ordinary skill in the art that various changes in form and details may be made therein without departing from the scope of the inventive concept as defined by the following claims.

What is claimed is:

1. A process for manufacturing a lithium selective adsorbent, the process comprising the steps of:
   a. intercalating an initial quantity of Gibbsite-bearing adsorbent precursor with lithium under alkaline conditions at a predetermined intercalation temperature using a pre-intercalation reaction volume of an intercalation reaction liquor to produce an intercalated layered aluminate adsorbent and a post-intercalation reaction volume of a partially depleted intercalation reaction liquor, wherein the intercalation reaction liquor comprises a lithium salt and an alkali in a brine, wherein the intercalation temperature is between about 25° C. and about 125° C., wherein the lithium salt comprises LiCl, wherein the alkaline conditions comprises an alkaline pH from about 7 to about 13, and wherein an alkali comprises NaOH;

b. decanting the post-reaction volume of the depleted intercalation reaction liquor from the intercalated layered aluminate adsorbent;

c. neutralizing the intercalated layered aluminate adsorbent under acidic conditions using an acid at a predetermined neutralization temperature to form the lithium selective adsorbent, wherein the neutralization temperature is between about 25° C. and about 115° C., and wherein an acid is acetic acid;

d. augmenting the decanted intercalation reaction liquor from step b. by adding brine, LiCl, and NaOH to reconstitute the pre-intercalation reaction volume of the intercalation reaction liquor from step a.; and e. recycling the augmented intercalation reaction liquor from step d. in preparation for intercalating a subsequent quantity of Gibbsite-bearing adsorbent precursor according to step a.

2. The process of claim 1 wherein the intercalation temperature is between about 85° C. and about 105° C.

3. The process of claim 1 wherein the brine comprises NaCl, NaBr, $NaNO_3$, KCl, KBr, or a mixture thereof.

4. The process of claim 3 wherein the brine is NaCl.

5. The process of claim 1 wherein the alkaline pH is between about 9 and about 12.

6. The process of claim 1 wherein the alkali has a concentration between about 1 to about 3 mol of the alkali per mol of $Al(OH)_3$ in the intercalated layered aluminate adsorbent.

7. The process of claim 6 wherein the alkali has a concentration between about 1 to about 1.5 mol of the alkali per mol of $Al(OH)_3$ in the intercalated layered aluminate adsorbent.

8. The process of claim 1 wherein the acidic conditions comprise an acidic pH from about 4.5 to about 7.

9. The process of claim 8 wherein the acidic pH is between about 5 and about 5.8.

10. The process of claim 1 wherein the neutralization temperature is between about 65° C. and about 80° C.

11. The process of claim 1 wherein the acetic acid has a concentration of between about 5% and about 100%.

12. The process of claim 1 wherein the step a. of intercalating the Gibbsite-bearing adsorbent precursor further comprises intercalating the Gibbsite-bearing adsorbent precursor by heating to the predetermined intercalation temperature in the presence of the lithium salt in the brine under the alkaline conditions for a predetermined amount of intercalation time.

13. The process of claim 12 wherein the predetermined amount of intercalation time is between about 0.375 hours and about 390 hours.

14. The process of claim 13 wherein the predetermined amount of intercalation time is between about 1.5 hours and about 6 hours.

15. The process of claim 1 wherein the step c. of neutralizing the intercalated layered aluminate adsorbent further comprises neutralizing the intercalated layered aluminate adsorbent under the acidic conditions at the predetermined neutralization temperature for a predetermined amount of neutralization time.

16. The process of claim 15 wherein the predetermined amount of neutralization time is between about 0.03125 hours and about 16 hours.

17. The process of claim 16 wherein the predetermined amount of neutralization time is between about 0.25 hours and about 1 hours.

18. The process of claim 1 further comprises the step of: producing the Gibbsite-bearing adsorbent precursor by forming aluminum hydroxide ($Al(OH)_3$) crystals in situ within pores of an ion exchange resin.

19. The process of claim 18 wherein the step of producing the Gibbsite-bearing adsorbent precursor further comprises the steps of:
impregnating the pores of the ion exchange resin with an aluminum chloride ($AlCl_3$) solution;
infiltrating the $AlCl_3$ impregnated resin with alkali to form $Al(OH)_3$ microcrystal seeds within the pores of the ion exchange resin;
infiltrating the $Al(OH)_3$ seeded resin with an alkaline aluminate solution, and using an acid to remove excess NaOH produced in the $Al(OH)_3$ microcrystal seeds formation.

20. The process of claim 18 wherein the ion exchange resin is a polystyrene-based ion exchange resin.

21. The process of claim 20 wherein the ion exchange resin is an organic, porous polystyrene-based ion exchange resin bead.

22. The process of claim 21 wherein the ion exchange resin is functionalized as a strong base anion (SBA) or a weakly basic anion (WBA) exchange resin, and optionally wherein the WBA exchange resin is in an HCl form before the step of impregnating the pores of the ion exchange resin with the $AlCl_3$ solution.

23. The process of claim 2 wherein the intercalation temperature is greater than 100° C. to about 105° C.

24. The process of claim 6 wherein the alkali has a concentration of greater than 1 to about 3 mol of the alkali per mol of $Al(OH)_3$ in the intercalated layered aluminate adsorbent.

25. The process of claim 24 wherein the alkali has a concentration of greater than 1 to about 1.5 mol of the alkali per mol of $Al(OH)_3$ in the intercalated layered aluminate adsorbent.

26. The process of claim 9 wherein the acidic pH is greater than to about 5.8.

27. The process of claim 10 wherein the neutralization temperature is greater than 70° C. to about 80° C.

28. The process of claim 13 wherein the predetermined amount of intercalation time is greater than 100 hours to about 390 hours.

29. The process of claim 16 wherein the predetermined amount of neutralization time is less than 2 hours.

30. The process of claim 1 wherein the lithium salt in the recycled and augmented intercalation reaction liquor has a concentration ratio of about 1:1 to about Li to Al.

31. The process of claim 1 further comprises:
a. intercalating the initial quantity of the Gibbsite-bearing adsorbent precursor with lithium by heating under the alkaline conditions at the predetermined intercalation temperature for a predetermined amount of intercalation time using the pre-intercalation reaction volume of the intercalation reaction liquor to produce the intercalated layered aluminate adsorbent and the pre-intercalation volume of the partially depleted intercalation reaction liquor, wherein the recycled and augmented intercalation reaction liquor comprises a lithium salt in a brine, temperature is between about 85° C. and about 105° C., wherein the lithium salt comprises a concentration ratio of about 1:1 to about 5:1 Li to Al in a NaCl brine, wherein the alkaline conditions comprises an alkaline pH from about 9 to about 12, wherein the alkali has a concentration of greater than 1 to about 3 mol of the alkali per mol of $Al(OH)_3$ in the intercalated layered aluminate adsorbent, and wherein the predetermined amount of intercalation time is between about 1.5 hours and about 6 hours;

b. decanting the post-reaction volume of the depleted intercalation reaction liquor from the intercalated layered aluminate adsorbent;

c. neutralizing the intercalated layered aluminate adsorbent under acidic conditions using the acid at the predetermined neutralization temperature for a predetermined amount of neutralization time to form the lithium selective adsorbent, wherein the neutralization temperature is between about 65° C. and about 80° C., wherein the acid is acetic acid, wherein the acidic conditions comprise a pH from about 5 to about 5.8, wherein the acetic acid has a concentration of between about 5% and about 100%; and wherein the predetermined amount of neutralization time is between about 0.25 hours and about 1 hours;

d. augmenting the decanted intercalation reaction liquor from step b. by adding a NaCl brine, LiCl, and NaOH to reconstitute the pre-intercalation reaction volume of the intercalation reaction liquor, or a combination thereof to the decanted intercalation reaction liquor;

e. recycling the augmented intercalation reaction liquor from step d. in preparation for intercalating the subsequent quantity of the Gibbsite-bearing adsorbent precursor according to step a.

32. The process of claim 1 further comprises the step of successively repeating steps a. through e. up to about seven times.

33. The process of claim 32 further comprises the step of successively repeating steps a. through e. up to about three times.

34. The process of claim 31 further comprises the step of successively repeating steps a. through e. up to about seven times.

35. The process of claim 34 further comprises the step of successively repeating steps a. through e. up to about three times.

* * * * *